United States Patent [19]

King

[11] Patent Number: 4,808,865
[45] Date of Patent: Feb. 28, 1989

[54] FAULT DETECTOR FOR ELECTRIC MOTOR AND CONTROL

[75] Inventor: James L. King, Troy, Ohio

[73] Assignee: A.O. Smith Corporation, Milwaukee, Wis.

[21] Appl. No.: 106,187

[22] Filed: Oct. 8, 1987

[51] Int. Cl.$^4$ .......................... H02K 11/00; H02J 1/00
[52] U.S. Cl. ........................ 310/71; 73/116; 340/648
[58] Field of Search ............. 73/116; 310/71, 89; 318/482, 563, 642; 324/537, 545, 546, 547; 340/635, 648

[56] References Cited

U.S. PATENT DOCUMENTS

| | | | |
|---|---|---|---|
| 1,865,347 | 6/1932 | Williams | 324/537 |
| 2,133,985 | 10/1938 | Green | 310/71 |
| 3,619,641 | 11/1971 | Ballard | 310/71 |
| 4,297,627 | 10/1981 | Schaefer | 310/71 |

FOREIGN PATENT DOCUMENTS 563554  6/1958  Belgium .................. 310/71

Primary Examiner—Patrick R. Salce
Assistant Examiner—D. L. Rebsch

[57] ABSTRACT

A spa or whirlpool tub includes an A.C. motor coupled to drive a pump. The motor includes a frame having a mounting portion. A motor winding within the frame is connected to an A.C. power supply. An electronic control unit includes a housing and is mounted to the frame. The control unit has a cable connecting the electronic control to a power receptacle. The cable includes a power plug for connecting to a power receptacle. A connecting cable is wired to the motor windings. The connecting cable includes a connector plug corresponding to the power cable unit, and the electronic unit includes a complementing connector receptacle. The incoming motor power supply can be alternately made through the electronic control unit or directly to the winding, for monitoring the operating state of the motor and control unit. A separate cable having a light and connector plug is inserted in the control unit receptacle, to separately monitor the operating state of the control unit.

10 Claims, 1 Drawing Sheet

FAULT DETECTOR FOR ELECTRIC MOTOR AND CONTROL

BACKGROUND OF THE INVENTION

This invention relates to an electric motor apparatus having an electronic control unit and particularly to the power connection of the motor and electronic control unit to the incoming supply for controlling the motor operation.

Electric motors are widely used in various industrial, consumer and other products. The motor is often provided with a control circuit for permitting various modes of motor operation. The particular mode of operation may be manually controlled or may be responsive to various line or other conditions. The power supply to the motor is then established through the electronic control circuit for appropriate energization of the motor. Spas, pools and whirlpool tubs are recent typical examples wherein electric motors are used for driving of pumps, air sources and the like. The small electric motors are provided with an electronic control unit including a controllable timer for controlling various modes of operating the product. A control unit is normally mounted as a separate control panel and interconnected by a separate cable to the motor proper. Input power is supplied to the control panel for appropriate operation of the electronic control and the motor. Alternatively, the control can be mounted as an integrated part of the motor.

A significant inconvenience associated with electric motor systems, particularly in consumer products, is caused by operating failure of the motor system. Upon failure, it is difficult at best for the consumer to know whether the failure is due to the control circuit or to the motor as such. This normally therefore requires a service call by a skilled electrical technician who can appropriately check and service each of the electronic circuit and the motor circuit. With the development of more sophisticated electronic controls, the availablity of properly trained service people can often create a problem. The consumer therefore is often faced with a costly charge, and at times with questionable quality of service.

If the fault can be isolated as to one of the two basic elements of system such as the control unit in contrast to the motor proper, a more rapid, efficient and reliable service can be provided. Electronic controls for example will often merely require replacement of a circuit board as a most economical method of correction. Conversely, if the motor itself has failed as by a burned out winding, the motor must be rebuilt at the service center and/or replaced. If the error fault can be so isolated, the consumer may elect to replace the defected component or at least the service man can rapidly and efficiently service the call at a minimum charge.

There is therefore a need for a simple and cost effective means of isolating faults within electric motor system having an electronic control for consumer products and the like.

SUMMARY OF THE INVENTION

The present invention is particularly directed to an electric motor having electronic control circuit unit constructed as an integrated part of the motor structure and including a motor power supply connection apparatus permitting rapid monitoring and separate checking of the electronic control circuit and the motor circuit proper without necessity of any special tools or technical skill. Generally in accordance with the teaching of the present invention, the power supply connection includes a conventional connecting cable to the electronic control unit. In addition, the electronic control unit is interconnected to the motor through a separate plug-in type connection permitting an alternate direct power connection to the motor using a standard plug-in supply. In the event of a fault condition, the consumer or other user can simply and rapidly isolate the location of the fault. Thus the user merely unplugs the power supply connection to the electronic control the interconnecting cable from the control unit to the motor and replaces the connections with a direct power connection to the motor. If the motor operates satisfactorily, the fault is located in the electronic control. If the motor does not however operate, a fault is located in the motor proper. A fault may remain in the control unit which can be checked by plugging in a separate test cable to the control unit; the test cable has a light or other signal means which is energized if the control unit is proper. The user or serviceman can therefore isolate the fault and directly correct the fault as by removal and replacement of the motor and/or removal and replacement of the appropriate circuit board. This provides a highly cost effective and rapid method of servicing at a minimal cost.

The electronic control unit may be built into the end bell of the motor or in a separate box releasably secured to the exterior of the motor. The unit built into the end bell may not be conveniently accessible to the service person and the separately housed control may be advantageous so the consumer can remove the control box for service at a service center. Again, in servicing the unit upon failure, it is merely necessary to remove the plug from the electronic control and place into the direct motor energizing system or plug, to rapidly and effectively isolate the fault.

The construction of the present invention requires inexpensive and standard components forming a part of the motor circuit connection. The invention thus provides a cost effective construction with a significant improvement in the service and maintenance of the motor drive system.

BRIEF DESCRIPTION OF THE DRAWING

The drawing furnished herewith illustrates the best mode presently contemplated for the invention and are described herewith.

In the drawings.

DESCRIPTION OF THE ILLUSTRATED EMBODIMENT

Figure 1:
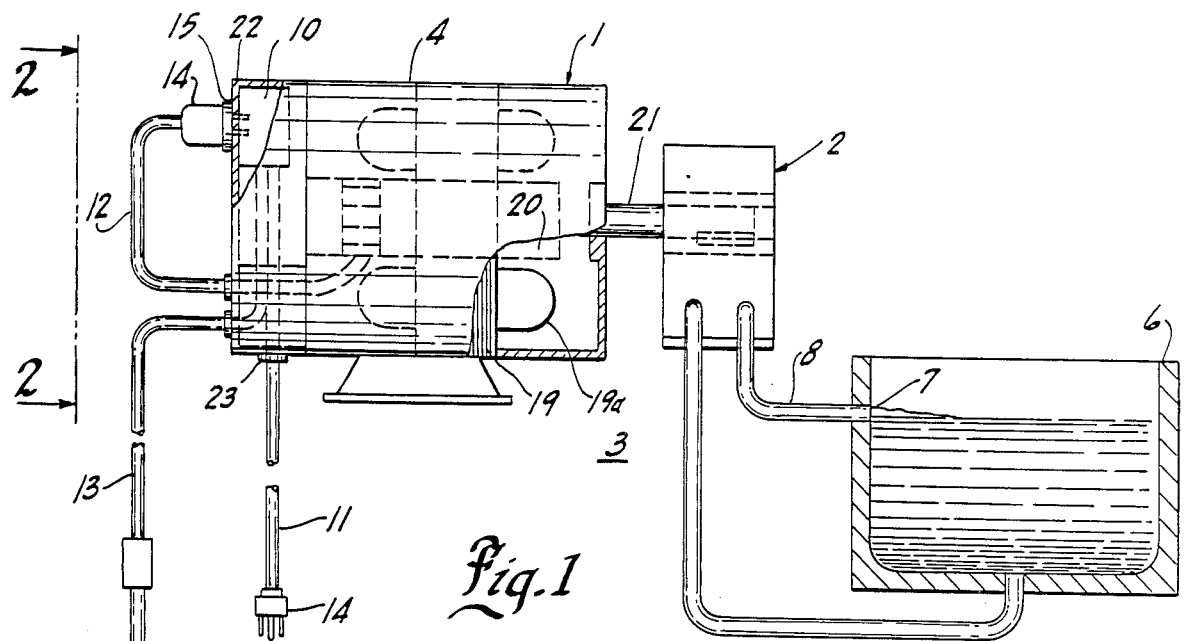
FIG. 1 is a side elevational view of an electric motor incorporating a monitor connector apparatus in accordance with the present invention.
Figures 2, 3:
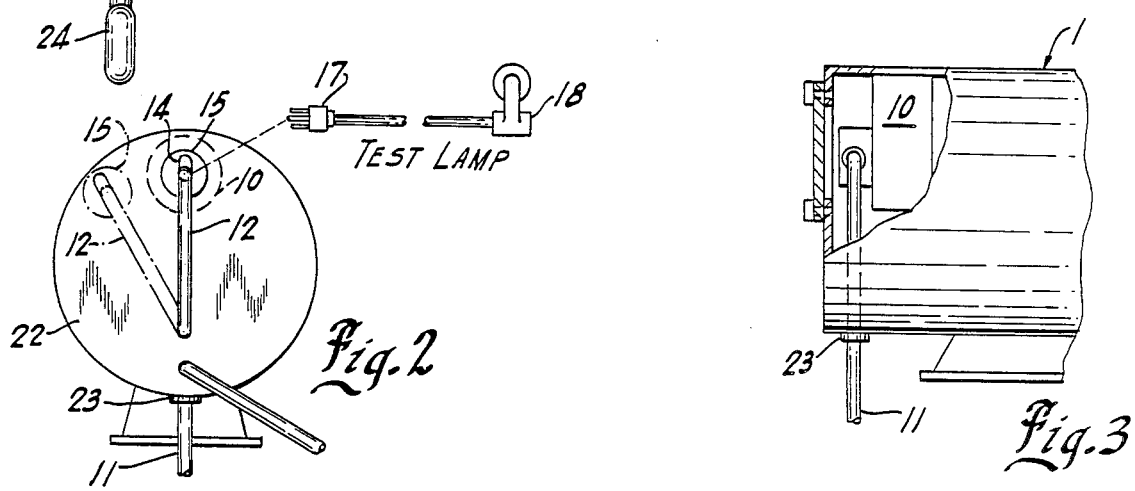
FIG. 2 is a front elevational view taken generally on line 2—2 of FIG. 1.
FIG. 3 is a fragmentary side view of a unit similar to FIG. 1 illustrating an alternate internal connection of the connector apparatus shown in FIG. 1 for monitoring purposes.

Referring to the drawings and particularly to FIGS. 1 and 2, an AC single phase motor 1 is illustrated which is adapted to be powered from a conventional consumer power supply such as a 110 volt power supply. The illustrated motor 1 is coupled to a pump unit 2 and forms a typical motor pump assembly 3 used for spas, home whirlpools and the like. The motor-pump assembly is mounted within a suitable enclosure 4 with the pump unit 2 coupled to provide circulation of water to an appropriate spa tub 6, or the like. Pump creates water jets via a supply line 8 with return of the water to the pump unit 2 from a drain or return line 9 of the spa tub 6. In such applications, it may be desirable to control the operating time of the jet system as well as the force to provide desired pulsating jets of water in the tub. This can be conveniently provided by controlling of the motor operation. An electronic control unit 10 of any known or desired construction is provided and connected between the incoming power supply line 11 and a power connection cable 12 to the motor 1. The electronic control unit 10 includes an appropriate timing means or other control circuit which can be provided with a suitable input control line 13 for user adjustment of the motor system operation. In such applications, the control unit 10 and the motor 1 must of course be appropriately installed. Further, such units are subject, under normal usage, to various malfunctions and faults. The defect may arise in the control unit 10 or in the motor 1. If the user can determine the location of the fault, correction can be made and/or information can be given to the service personnel prior to making the service call. Alternatively, the consumer or user can conveniently remove the appropriate component. If only the control unit malfunctions, the unit 10 can be removed for replacement or delivery to a service station. Further, a service person can also more rapidly isolate and locate the fault, thereby minimizing the time and cost of a service call.

In accordance with the illustrated embodiment of the present invention, the control unit 10 is connected to the power supply by a connection power cable 11 having an external three-prong plug 13a for connection to a conventional power supply receptacle, not shown, as normally available in a home or other similar establishment. The power line 11 may of course be hard wired to the supply wiring system. The motor is connected to the control unit 10 by the separate cable 12 terminating in a conventional three-prong plug 14. The motor is properly connected to power by plugging of the cable plug 14 into a complementary receptacle 15 on unit 10.

Under normal operation, power is supplied to the control unit 10 and through the cable unit 12 to the motor 1 to establish and provide appropriate motor operation. The motor of course operates the pump unit 2 in accordance with the setting of the electronic control unit 10 to produce the desired water circulation to the spa tub 6. In the event of failure, the user can conveniently monitor and locate the fault.

If for any reason a malfunction occurs wherein the pump unit is not operating appropriately the consumer can readily monitor and locate the fault either in the control unit or in the motor by removing of the three prong plug 14 and connecting the plug to the wall receptacle of the home power supply. If the motor 1 operates appropriately to drive the pump unit 2, the malfunction obviously exists in the control unit. If the pump is not driven, it is a clear indication that a fault is in the motor proper and the control unit may or may not be defective. The control unit 10 is separately monitored by use of separate test extension cable 16 having a plug 17, shown in FIG. 2. A light unit 18 is connected in series within cable 16. The cable 16 is connected to the control receptacle 15 of unit 10. If the light works, unit 10 is functioning. If light remains off, unit 10 is defective.

More particulary, in the illustrated embodiment of the invention, the motor 1 is illustrated as a well known AC rotary motor having a annular stator 19 with the motor winding 19a therein. A rotor 20 is rotatably mounted in suitable end frame members secured to the stator with the motor shaft 21 projecting outwardly from one end and coupled to the pump unit 2.

The control unit 10 and incoming power connection is made within an end enclosure 22 secured to the opposite end of the motor. The control unit 10 is mounted to the end wall of enclosure and is shown hardwired to the incoming power supply cable 11. The cable enters through a grommetted opening 23 in the lower end of the enclosure and extends outwardly to a main power terminal connection and/or plug unit 13a. In actual practice, the motor can be hard wired to a wiring box in the home adjacent to the spa unit or provided with a plug-in unit 13a for connection to an incoming wall receptacle or the like. The three-prong plug is used in accordance with conventional practice, having two current carrying conductors plus the safety ground. The motor plug can then be conveniently removed and plugged into any suitable three wire receptacle or extension cord which is similarly constructed with the current conductors and the appropriate ground. The control line 13 is connected to the unit 10 and extends outwardly through the lower front portion of the enclosure to provide a remote control for setting of the timer. The control line 13 may be a pneumatic tube, a low voltage cable or the like which extends from the tub, spa or other application to a control area. The pneumatic line may be connected to a hand-operated pneumatic pump element 24. Operation of element 24 operates to set a timer, not shown, within the control unit. Alternately, a suitable electrical signal control system can be used. Such control systems are known and used in the industry and no further description thereof is given.

The motor winding 19a is connected by the cable 12 to the control unit 10. As illustrated, the cable 12 is hardwired to the winding 19 in the lower portion of the stator assembly. The cable 12 projects outwardly through the end of the stator shell into the enclosure 22 and then exteriorily of the enclosure, through a grommeted opening, and terminates in the three pronged plug 14. The control unit is mounted on a wall of the enclosure 22 and has a corresponding three pronged receptacle 15 for releasably receiving the three pronged plug 14. A simple plug in connection can be employed, or a suitable lock means can be provided to releasably hold the plug to the receptacle to prevent accidental or inadvertent separation of the connection.

Further, it is not necessary to provide an exterior mounting of the cable unit.

For example, FIG. 3 shows modification to the structure shown in FIGS. 1 and 2 wherein the control unit 10 is located totally within the enclosure 22 such as shown in FIGS. 1 or 2. The same elements shown in FIG. 3 as shown in FIGS. 1 and 2 are similarly numbered for simplicity of description. The plug-in receptacle 15 on the timer 10 is located within the enclosure 22. The winding cable 12 extends from motor 1 into the enclosure 22 with the plug unit 14 inserted into the receptacle 15 within the enclosure 22. The enclosure 22 is provided with an appropriate access opening 30 with a releasable cover 31 for permit access to the three pronged plug to removal thereof for testing of the motor as in the first embodiment.

Further, the motor can of course further be constructed with a completely separate electronic control assembly. An alternate embodiment including such a separately constructed control assembly 32 is illustrated in FIGS. 4 and 5.

Figures 4, 5:
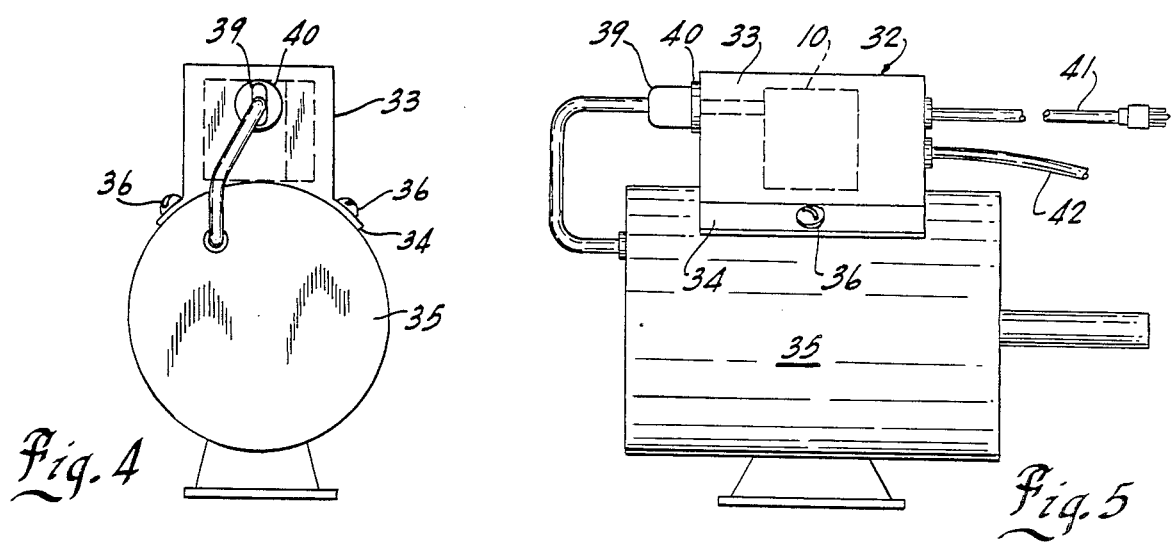
FIGS. 4 and 5 are views similar to FIGS. 1 and 2 illustrating an alternate construction of the present invention with a separately mounted motor control assembly.

Referring particularly to FIG. 4 the electronic control unit 32 is formed with a separate housing 33. In this embodiment, the control housing 33 includes a mounting bracket 34 at its lower end generally complementing the external configuration of the outer frame of a motor 35. The control unit housing 33 is releasably mounted to the motor by appropriate set screws 36 or the like.

The motor as in the prior embodiment is a conventional AC motor having a shaft for connection to drive a pump or the like.

In the embodiment of FIG. 4, a coupling cable 38 is again coupled to the motor winding, not shown, and extended outwardly through the outer end of the motor remote from the shaft end. The cable 38 is of sufficient length to be folded backwardly into coupling engagement with the electronic control assembly 32. A three prong plug 39 is shown on the end of the cable which is adapted to plug into a complementary receptacle 40 on the outer wall on the electronic control housing 33.

The incoming power line 41 projects through a grommeted opening in the opposite wall of the control housing 33. The power line 41 is interconnected to the control circuit in the control unit 32 for transfer of selective power to the power receptacle and thereby to the motor. A control line 42 is shown extending through a grommeted opening in the forward wall of the control housing for user adjustments of the motor operator.

The second embodiment obviously operates in essentially the same manner as the previous embodiment. Thus, the motor winding cable is merely removed or separated from the plug in connection to the control unit and connect directly to the incoming line for a conventional home power receptacle with corresponding monitoring of the location of the fault, either in the motor or in the home unit as such.

The control unit 10 is also separately monitored by plugging in the special test cable with the 115 volt test light into the electronic control receptacle 40. The main switch is turned on. If the light is turned on, the control unit is operating satisfactorily, and the motor is bad. If the light remains off, it would indicate that the control unit is not operating properly.

The separately mounted electronic control unit of FIGS. 4 and 5 provides a simple system permitting removal for service and the like. The embodiment of FIG. 4 also provides convenient expansion of the electronic control and/or replacement with more advanced controls. Further, various types of spas, tubs and pools may require different electronic control units while using a standard motor. The separate package of course also permits direct production of the necessary combination without necessity of complete inventorying of the integrated motor/control package. The motor control mounted within the motor, however, provides a high strength and easily handled motor control unit. This provides the minimum complexity with respect to handling and handling damage to the manufacture of the final equipment, namely, the tubs, spas or the pools.

The present invention thus provides a simple and inexpensive system for checking the operating status of motor-pump unit or the like and which can be readily completed by the ultimate user and consumer without any technical knowledge or skill.

Various modes of carrying out the invention are contemplated as being within the scope of the following claims particularly point out and distinctly claiming the subject matter which is regarded as the invention.

I claim:

1. An electric motor apparatus adapted to be interconnected to an incoming power supply line, comprising a motor having a motor winding means for operating the motor, an electronic control unit having a power input means for connection to a motor power supply, a connecting cable means having a releasable connector on a first end releasably connected to said electronic control unit and having an opposite and direct connected to said motor winding means for controlled and selected energizing of said winding means to control the operating mode of the motor, said releasable connector defining an alternate power input means for supplying power directly to said motor independent of said electronic control unit, and a test means including a display load means and a releasable connector corresponding to the releasable connector on said first end of cable means for connection to said control unit 2. An electric motor apparatus adapted to be interconnected to an incoming power supply line, comprising an electric motor having winding means adapted to be connected directly to a incoming power supply for operating of the motor, an electronic control unit including input means for setting the motor operation, means connecting said electronic control unit to said motor winding means for controlled and selected energizing of said winding means to control the operating mode of the motor, a power supply means connected to said control unit and including a releasable connector unit for supplying of power through said control unit to the motor windings in accordance with the operating mode determined by said electronic control unit, said means connecting said electronic control unit to said winding means including a releasable connector unit corresponding to said connector unit of said power supply means and defining an alternate incoming power supply connection for supplying power directly to said motor winding means independent of said electronic control unit and defining an alternate test load connection to said control unit to test the electronic control unit.

3. The electric motor apparatus of claim 1 wherein said means for connecting of said electronic control unit to said winding means includes a connecting cable connected to the winding means and having a plug-in unit releasable connected to a complementary plug-in unit connected to said electronic control unit, said power input means including a supply connector plug-in unit corresponding to the plug-in unit of said cable whereby the incoming power supply can be alternately connected to said control unit and directly to said winding plug-in unit.

4. The motor apparatus of claim 1 wherein said motor includes a motor frame structure, said control unit mounted to said frame structure and said releasable connector unit including a plug-in type connector forming one half of a plug-in type connector unit for supplying of power to the motor windings in accordance with the state of said electronic control unit.

5. The motor apparatus of claim 1 wherein said motor includes a frame, and said control unit includes an outer housing, and means securing said housing to said motor frame.

6. The motor apparatus of claim 5 wherein said motor frame includes an outer cylindrical stator member, said housing including a cup-shaped member secured to one end of said motor, said releasable connector including a connector part secured to said cup-shaped member and accessible from the exterior of said cup-shaped member.

7. The motor apparatus of claim 5 wherein said motor frame includes a tubular stator frame member, said housing including mounting arms abutting said frame member, screw means connecting said arms to said frame member, said releasable connector including a first connector part secured to said housing and accessible from the exterior of said housing, and said connecting means including a wiring cable connected to said winding means and extending from said frame, said cable terminating in a second connector part complementing said first connector part.

8. The electric motor apparatus of claim 2 wherein said means for connecting of said electronic control unit to said winding means includes a connecting cable, said releasable connector unit including a three-prong plug-in connector adapted to be connected to a three prong receptacle of a power supply system, whereby said motor can be alternately connected directly to said power supply system.

9. The electric motor apparatus of claim 2 wherein said connector units have corresponding releasable connector units for connection to the same power supply.

10. The electric motor apparatus of claim 2 wherein said input means to said control unit includes a three prong plug.

* * * * *

UNITED STATES PATENT AND TRADEMARK OFFICE
CERTIFICATE OF CORRECTION

PATENT NO. : 4,808,865
DATED : February 28, 1989
INVENTOR(S) : James L. King

It is certified that error appears in the above-identified patent and that said Letters Patent is hereby corrected as shown below:

Col. 6, line 60, claim 3: delete "releasable" and substitute therefor ---releasably---

Signed and Sealed this

Nineteenth Day of November, 1991

Attest:

HARRY F. MANBECK, JR.

*Attesting Officer*  *Commissioner of Patents and Trademarks*